United States Patent [19]
Gardner

[11] 3,711,169
[45] Jan. 16, 1973

[54] TILTING-FLEXIBLE PAD JOURNAL BEARING

[75] Inventor: Willis W. Gardner, Waukesha, Wis.
[73] Assignee: Wankesha Bearings Corporation, Waukesha, Wis.
[22] Filed: Dec. 15, 1971
[21] Appl. No.: 208,211

[52] U.S. Cl. ................................................308/73
[51] Int. Cl. ..............................................F16c 17/06
[58] Field of Search ..........................308/160, 73, 37

[56] References Cited

UNITED STATES PATENTS 1,405,317   1/1922   Newbigin ...............................308/73

*Primary Examiner*—Milton Kaufman
*Assistant Examiner*—Frank Susko
*Attorney*—Arthur L. Morsell, Jr. et al.

[57] ABSTRACT

A pad-type journal bearing that utilizes both tiltable pads and flexible pads for controlling the vibrations of a relatively high speed shaft. The tiltable pads are arranged in a generally conventional manner and tilt in response to rotation and vibrations of the shaft. The flexible pads are interposed between the tiltable pads and the shaft. The radius of curvature of the inner surface of the flexible pads is slightly larger than the radius of curvature of the shaft, and the radius of curvature of the outer surface of the flexible pads is slightly larger than the radius of curvature of the adjacent inner surface of the tiltable inner pad. The radial thickness of the flexible pads is slightly smaller than the radial distance between the shaft and the inner surface of the tiltable pads. The bearing is flood lubricated. Vibrations of the shaft are transmitted as dynamic loads through the hydrodynamic oil film to the flexible pads. Due to the pad construction and beam-type support, the flexible pads deflect in the central portion when subjected to a load from the shaft weight and/or dynamic loads as from shaft vibration. Vibrations of the flexible pads alternately squeeze and expand a pocket of oil in the space between the flexible pad outer surface and the adjacent inner surface of the tilting pad to provide "squeeze film" damping. Thus this bearing design uniquely provides tilting action, beam-type support flexibility, and squeeze film damping for the control of vibrations of high speed rotors.

10 Claims, 3 Drawing Figures

PATENTED JAN 16 1973

TILTING-FLEXIBLE PAD JOURNAL BEARING

BACKGROUND OF THE INVENTION

This invention relates to pad-type journal bearings for use in relatively high speed rotating systems and is an improvement upon the flexible pad journal bearing disclosed in my co-pending application, Ser. No. 184,073 which was filed on Sept. 7, 1971, for a "Flexible Pad Journal Bearing." In rotating machinery systems such as steam turbines, gas turbines, compressors, or the like, there is often an increase in shaft vibration as the speed of rotation is increased. Therefore, in order to operate the system at high speeds, it is necessary to provide bearings which are capable of limiting these relatively high levels of vibrations. In the past, various bearing types and constructions, including lobe-type, tilting pad, flexible mountings, flexible pads, and squeeze film damping mountings, have been used with varying degrees of success to control the various rotor vibration problems. It is the object of this invention to extend the speed range of such bearings or mounting constructions by providing a padtype journal bearing that utilizes a combination of tilting support, flexible beam support, and squeeze film oil damping to permit operations at higher speeds than heretofore known in the art and to provide improved vibration absorption characteristics.

Another object of this invention is to provide a pad-type journal bearing of the above-noted character which is sturdy in structure, reliable in operation, and relatively inexpensive in cost.

SUMMARY OF THE INVENTION

In accordance with this invention, the above-noted objects are achieved by utilizing a bearing pad combination which has tiltable pads for its outer peripheral portion and flexible pads for its inner annular surface.

In the preferred embodiment these pad combinations are loosely constrained in spaced endwise relation around the shaft within a circular channel in a bearing shell or housing. The outer surface of the tiltable pads has a radius of curvature that is smaller than the radius of curvature of the adjacent bottom of the circular channel. This allows the pads to tilt in response to rotation and vibrations of the shaft. The flexible pads are interposed between the tiltable pads and the shaft and have an inner and outer radius of curvature which are slightly larger than the radius of curvature of the facing surfaces. The radial thickness of the flexible pads is slightly smaller than the radial distance between the shaft and the adjacent inner surface of the tiltable pads. When the shaft vibrates (or whirls) within the bearing clearance, it dynamically loads and deflects the center of the flexible pads, and this motion is transmitted to the oil in the space between the flexible pad outer surface and the inner surface of the tiltable pad. Thus a beam-type loading of the flexible pads is provided which enables them to flex and so to absorb the vibrations of the shaft. In flexing, however, the flexible pads act on the oil that is trapped between the outer surface of the flexible pad and the inner surface of the tiltable pad. This produces a squeeze film oil damping that enhances the vibration damping characteristics of the bearing. For a vertical or lightly loaded shaft this design provides a preloaded type bearing with its excellent pad stability characteristics. For a loaded shaft, the flexible pad in the direction of the load deflects due to the loaded beam action, changing the curvature and presenting to the shaft a configuration approaching that of a zero preload tiltable pad bearing which has a higher load capacity than a preloaded bearing. Thus, as the load increases the load capacity increases. As the load decreases, and the whirl tendency of the rotor increases, the bearing becomes more stable. The amount of flexibility and damping desired for a particular application depends upon the rotor characteristics. The design is such, however, that both the flexibility and damping can be readily changed by changes in dimension. In addition, the inherently excellent stability characteristics of the tilting pad design are included in this arrangement.

DETAILED DESCRIPTION OF THE INVENTION

Figure 1:
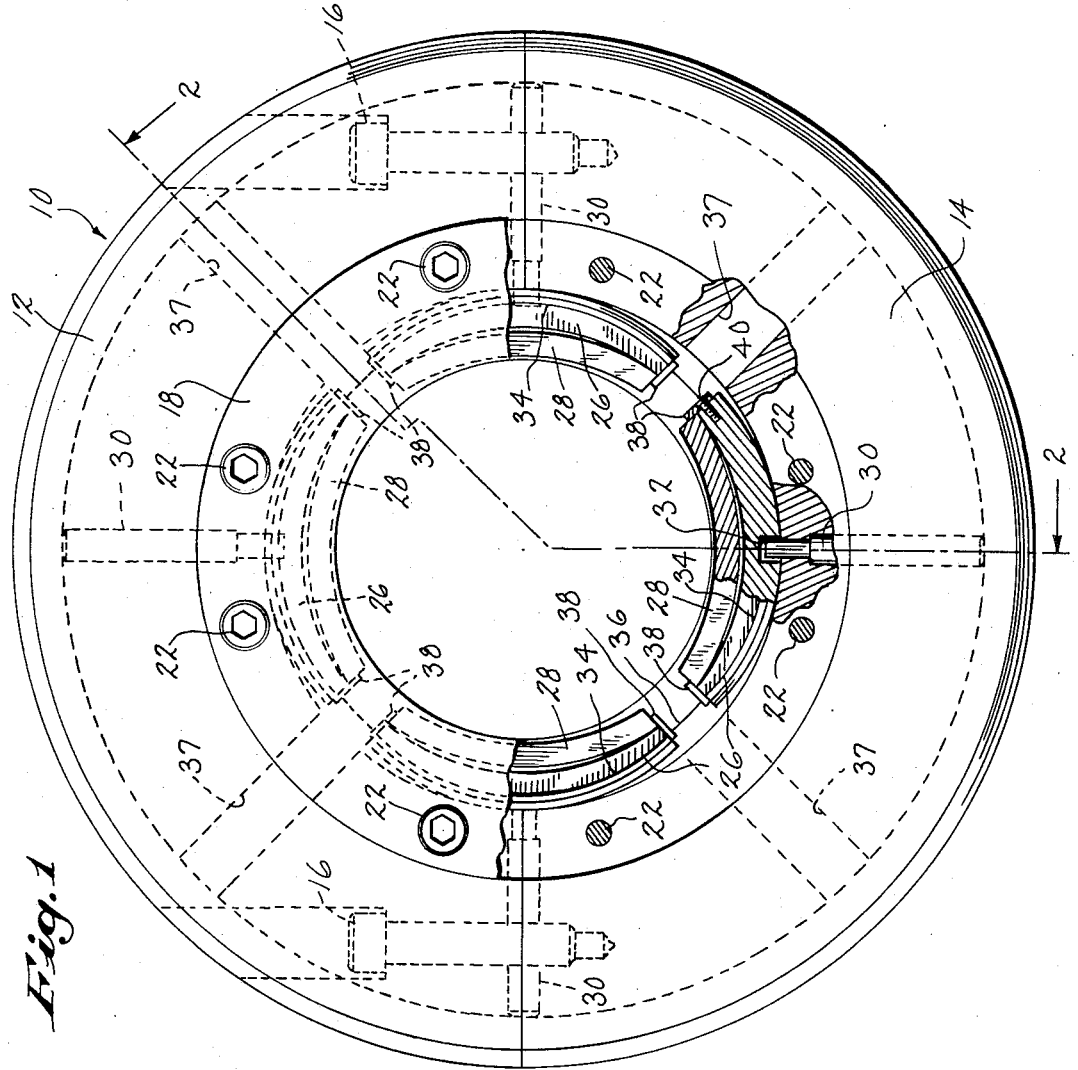
FIG. 1 is a partially cut away plan view of one illustrative embodiment of the invention.

Referring to FIG. 1, one illustrative embodiment of the invention comprises an annular bearing shell or housing 10 which is made of two 180° segments 12 and 14 which are joined together by four machine screws 16. Only two of the machine screws 16 are visible in FIG. 1, the other two being positioned behind the visible screws. Two annular collars 18 and 20 are attached to opposing inside edges of the housing members 12 and 14 by means of machine screws 22 and 24. The space between the inside surface of collars 18 and 20 and the inner periphery of housing 12 and 14 defines a pad-receiving channel in which the tiltable pads 26 and flexible pads 28 of this invention are seated in endwise relationship around the inner annular portion of the bearing housing 10. This particular embodiment of the invention utilizes four tiltable pads 26 and four flexible pads 28, but the number may be varied. The operation of the tiltable pads 26 and flexible pads 28 will be explained in connection with the simplified drawing of FIG. 3 in which the dimensions of the pads are exaggerated for the purposes of illustration.

Figure 2:
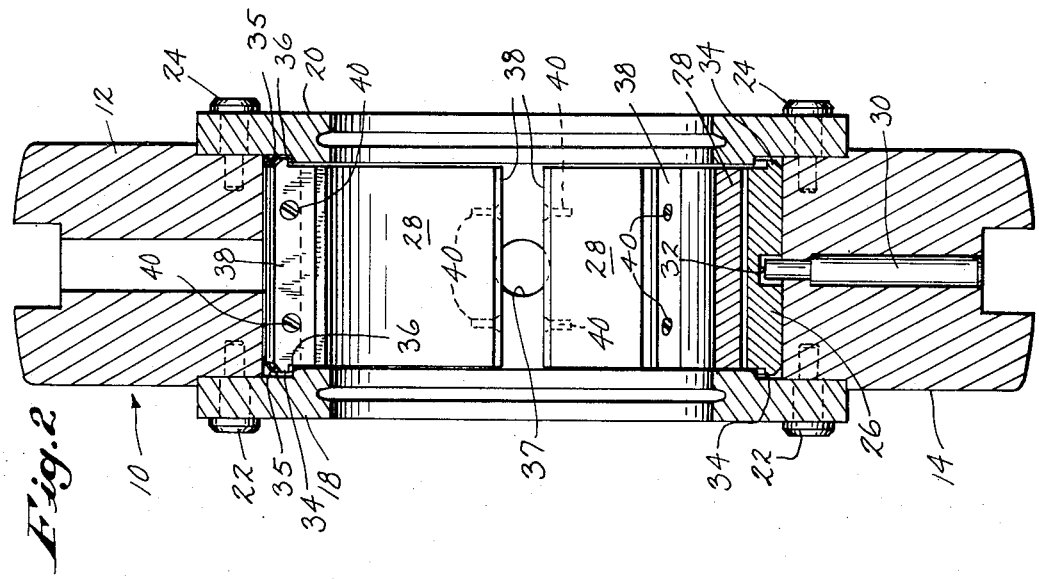
FIG. 2 is a cross-sectional view taken on the line 2—2 of FIG. 1.
Figure 3:
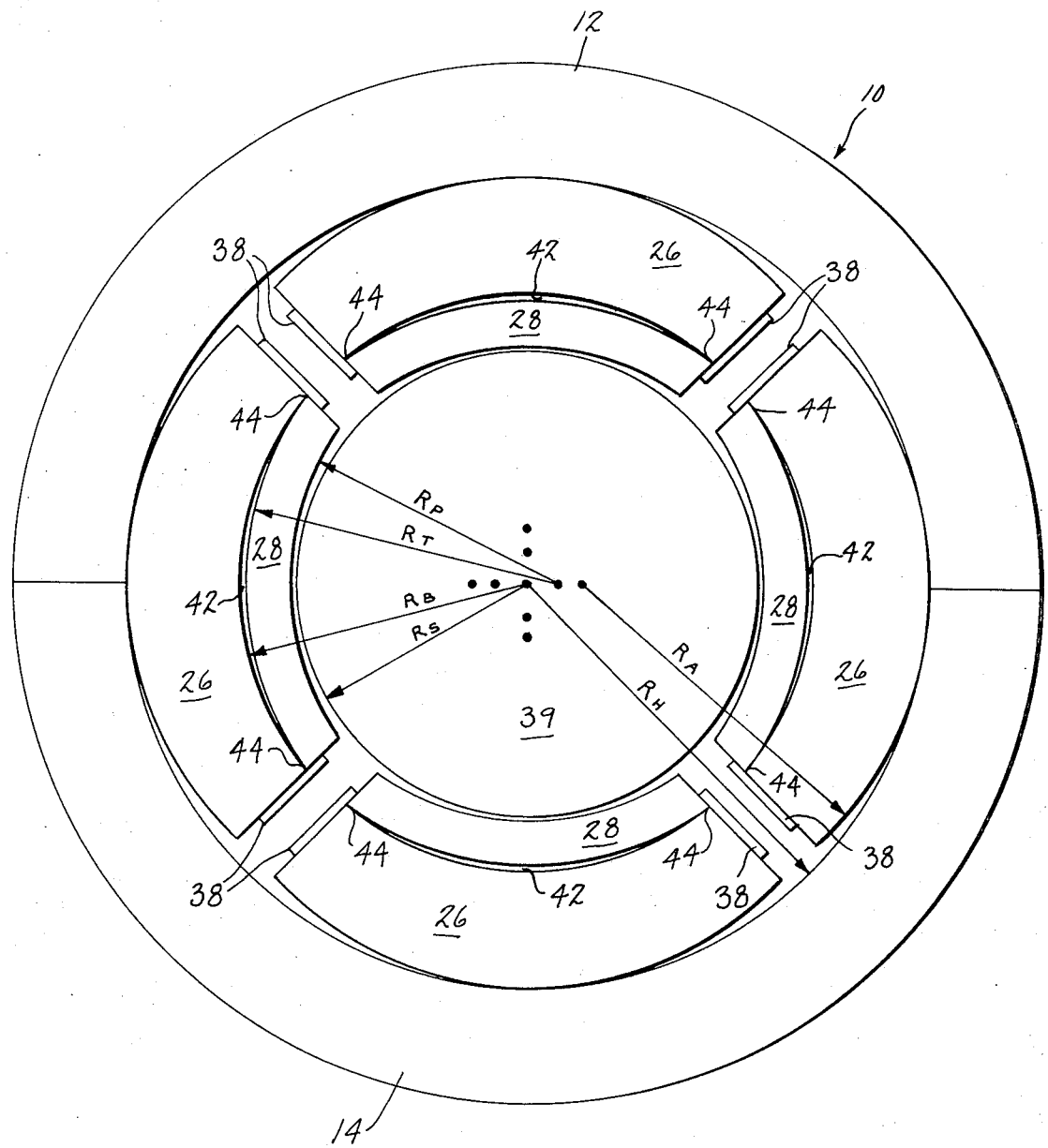
FIG. 3 is a diagrammatic representation of the bearing pads and bearing housing of FIGS. 1 and 2 illustrating their radii of curvature.

Referring to FIG. 3, the tiltable pads 26 have an outer radius of curvature $R_a$ which is eccentric with respect to the shaft radius $R_s$ and is smaller than the radius $R_h$ of the bottom of the pad-receiving channel formed by the semi-cylindrical sections 12 and 14 of the bearing housing 10. This allows the tiltable pads 27 to tilt in response to shaft rotation and vibrations applied to the inner surface thereof. As shown in FIGS. 1 and 2, the tiltable pads 26 are loosely constrained within the pad-receiving channel by means of pins 30 which engage openings 32 formed in the central portion of the tiltable pads 26. The openings 32 are larger than the pins 30 so as to allow the tiltable pads 26 to tilt and yet to constrain them from being moved transversely in response to shaft rotational forces. Each tiltable pad 26 is constrained from moving too far inwardly by means of a laterally-projecting arcuate lip 34 (FIG. 2) which engages an arcuate ledge 36 formed on the collar members 18 and 20, the collars 18 and 20 being of reduced thickness outwardly of the ledges 36 as at 35. The lip 34 and ledge 36 provide a loose fit which prevents the tiltable pads 26 from moving too far inwardly but yet allows them to tilt enough to accommodate the range of motions for which the bearing is designed.

The bearing is flood lubricated through lubrication bores 37 which extend from the outer periphery of the bearing housing 10 to the inner surfaces of the flexible pads 28. Referring again to FIG. 3, the flexible pads 28 are positioned between the tiltable pads 26 and the shaft 39, with each of the flexible pads 28 being held in position by means of restraining plates 38 which are fastened to the edges of the tiltable pads 26 by means of screws 40 (see FIG. 2). Each of the flexible pads 28 is arcuate in shape and has an inner and outer curved surface, both of which are eccentric with the shaft 39 as indicated by the radii $R_p$ and $R_t$. The inner radius of curvature $R_p$ is slightly larger than the radius of the shaft $R_s$ and the outer radius $R_t$ is slightly larger than the inner radius $R_b$ of the adjacent tiltable pad 26. The radial thickness of flexible pads 28 is somewhat less than the radial distance between the shaft 39 and the inner surface of the tiltable pads 26. The difference in radii is, however, measured in thousandths of an inch and, accordingly, it should be understood that the dimensions shown in FIG. 3 are exaggerated for the sake of illustration.

The above-noted differences in the radius of curvature produces a gap 42 of a few thousandths of an inch between the central portion of the outer periphery of each flexible pad 28 and the inner surface of the adjacent tiltable pad 26. The outer end portions 44 of the flexible pads 28 contact the adjacent inner surface of the tiltable pads 26. This provides for a beam-type support and thus provides the control of support flexibility needed for high speed rotor design. Since the bearing is flood lubricated, a pocket of oil will be trapped in the gap 42 between the portions 44 so as to provide a pocket of oil between the outer periphery of each flexible pad 28 and the adjacent surface of a tiltable pad 26. This pocket of oil is only a few thousandths of an inch thick at its thickest point so that it will provide squeeze film oil damping for vibrations of the flexible pads 28.

The tiltable pads 26 and flexible pads 28 can be made of any suitable material, but in this embodiment of the invention it is preferable to use steel for the tiltable pads 26 and aluminum for the flexible pads 28.

From the foregoing description it will be apparent that this invention provides a journal bearing which combines the attributes of a tilting pad-type bearing with those of mechanical beam-type flexing and "squeeze film" oil damping therefor. Although this invention has been described in connection with one illustrative embodiment thereof, it should be understood that the invention is by no means limited to the disclosed embodiment since many modifications can be made in the disclosed structure without altering its fundamental principles of operation. For example, although four bearing pads have been disclosed in this embodiment of the invention, it will be apparent to those skilled in the art that three pads or five pads might be used in different embodiments of the invention. This invention includes all such modifications as may fall within the scope of the following claims.

What I claim is:

1. In a tiltable pad journal bearing having a rotatable shaft and wherein there is an annular bearing housing with an annular pad-receiving channel, and wherein there is a plurality of tiltable pads positioned around said shaft in endwise relationship within said pad-receiving channel, said tiltable pads having inner arcuate surfaces, the improvement comprising a plurality of flexible pads positioned in endwise relationship around the shaft between said shaft and the inner arcuate surfaces of said tiltable pads, each flexible pad having an inner arcuate surface which is eccentric with respect to the shaft and with a radius of curvature which is slightly greater than the radius of curvature of said shaft, and each of said flexible pads having an outer arcuate surface which is on a slightly greater radius than the radius of curvature of adjacent inner arcuate surface portions of the tiltable pads so that the flexible pads are deflectable intermediate their length when subjected to a load, and means for supplying lubricating fluid between the inner arcuate surfaces of the flexible pads and the shaft and between the outer arcuate surfaces of the flexible pads and the inner arcuate surfaces of the tiltable pads.

2. A tiltable pad journal bearing as claimed in claim 1 in which the tiltable pads and flexible pads are formed of metal.

3. A tiltable pad journal bearing as claimed in claim 1 in which the radial thickness of the flexible pads is slightly less than the radial distance between the shaft and inner arcuate surface portions of the tiltable pads.

4. A tiltable pad journal bearing as claimed in claim 1 in which the means for supplying lubricating fluid includes lubrication bores in the housing extending from the exterior to the pad-receiving channel.

5. A tiltable pad journal bearing as claimed in claim 4 in which there are spaces between the ends of the tiltable pads, and in which said lubrication bores communicate with said spaces.

6. A tiltable pad journal bearing as claimed in claim 1 in which the tiltable pads are made of steel, and in which the flexible pads are made of aluminum.

7. A tiltable pad journal bearing as claimed in claim 1 in which there is a flexible pad for each tiltable pad, and in which the flexible pad deflects into a space between the flexible pad and tiltable pad which is intermediate the length of said pads.

8. A tiltable pad journal bearing as claimed in claim 7 and including retaining means between each tiltable pad and its flexible pad for maintaining each flexible pad in position against circumferential movement relative to its tiltable pad.

9. A tiltable pad journal bearing as claimed in claim 8 in which the retaining means comprises lips projecting radially from the ends of each tiltable pad between which the associated flexible pad is mounted.

10. A tiltable pad journal bearing as claimed in claim 7 in which the ends of the outer surface of each flexible pad engage the inner surface of the adjacent tiltable pad near the ends thereof, and in which there is a fluid-filled deflection space between said places of engagement.

* * * * *